(No Model.) 5 Sheets—Sheet 1.

H. W. MORLEY & T. HOLEHOUSE.
VALVE GEAR FOR DUPLEX DIRECT ACTING ENGINES.

No. 516,896. Patented Mar. 20, 1894.

*FIG.1.*

WITNESSES.
E. B. Bolton
E. A. Scott

INVENTORS.
Herbert William Morley
Thomas Holehouse
By Richards & Co.
their Attorneys.

(No Model.)

5 Sheets—Sheet 3.

H. W. MORLEY & T. HOLEHOUSE.
VALVE GEAR FOR DUPLEX DIRECT ACTING ENGINES.

No. 516,896.

Patented Mar. 20, 1894.

WITNESSES.
E. B. Bolton
E. A. Scott

INVENTORS.
Herbert William Morley
Thomas Holehouse
By Richards & Co.
their Attorneys.

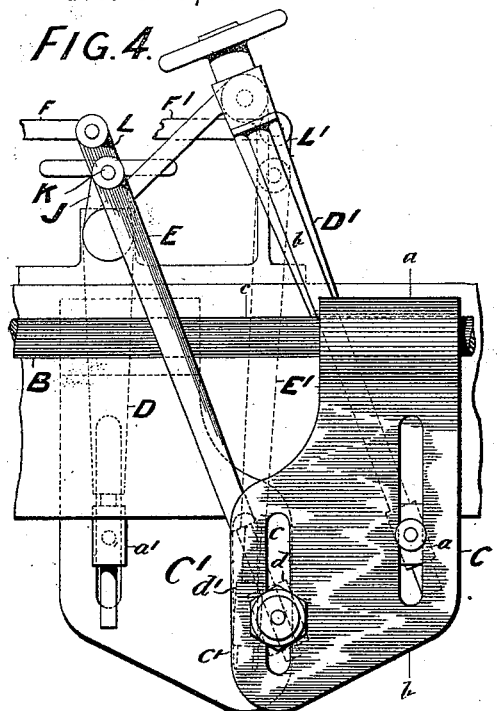
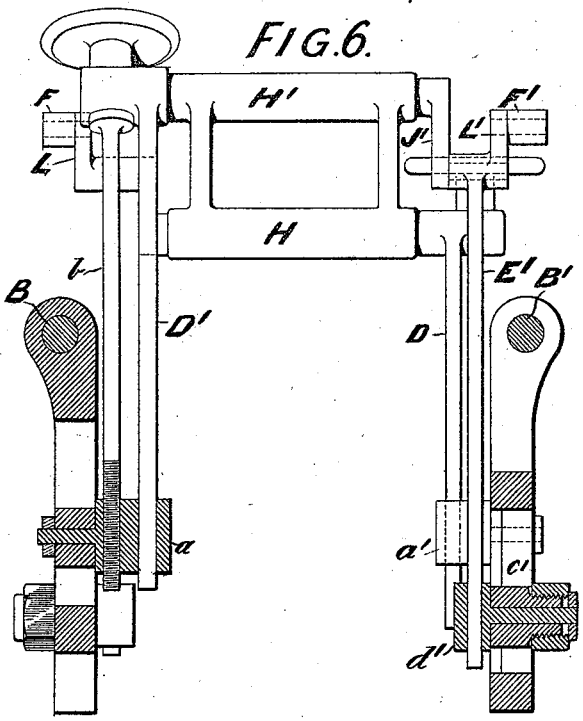
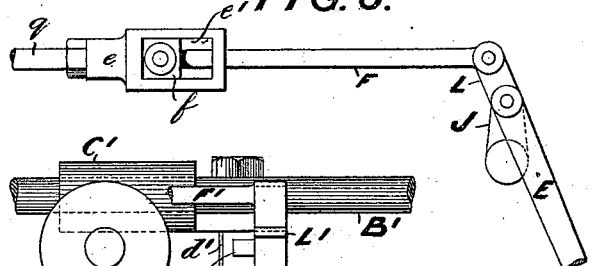
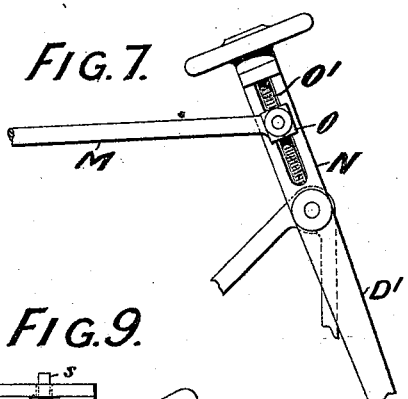
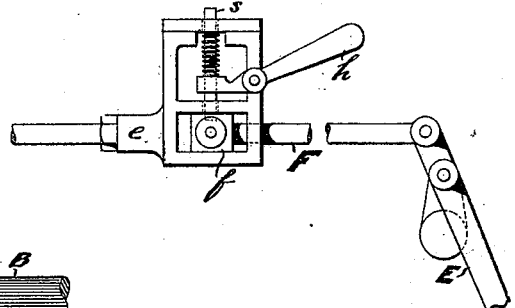

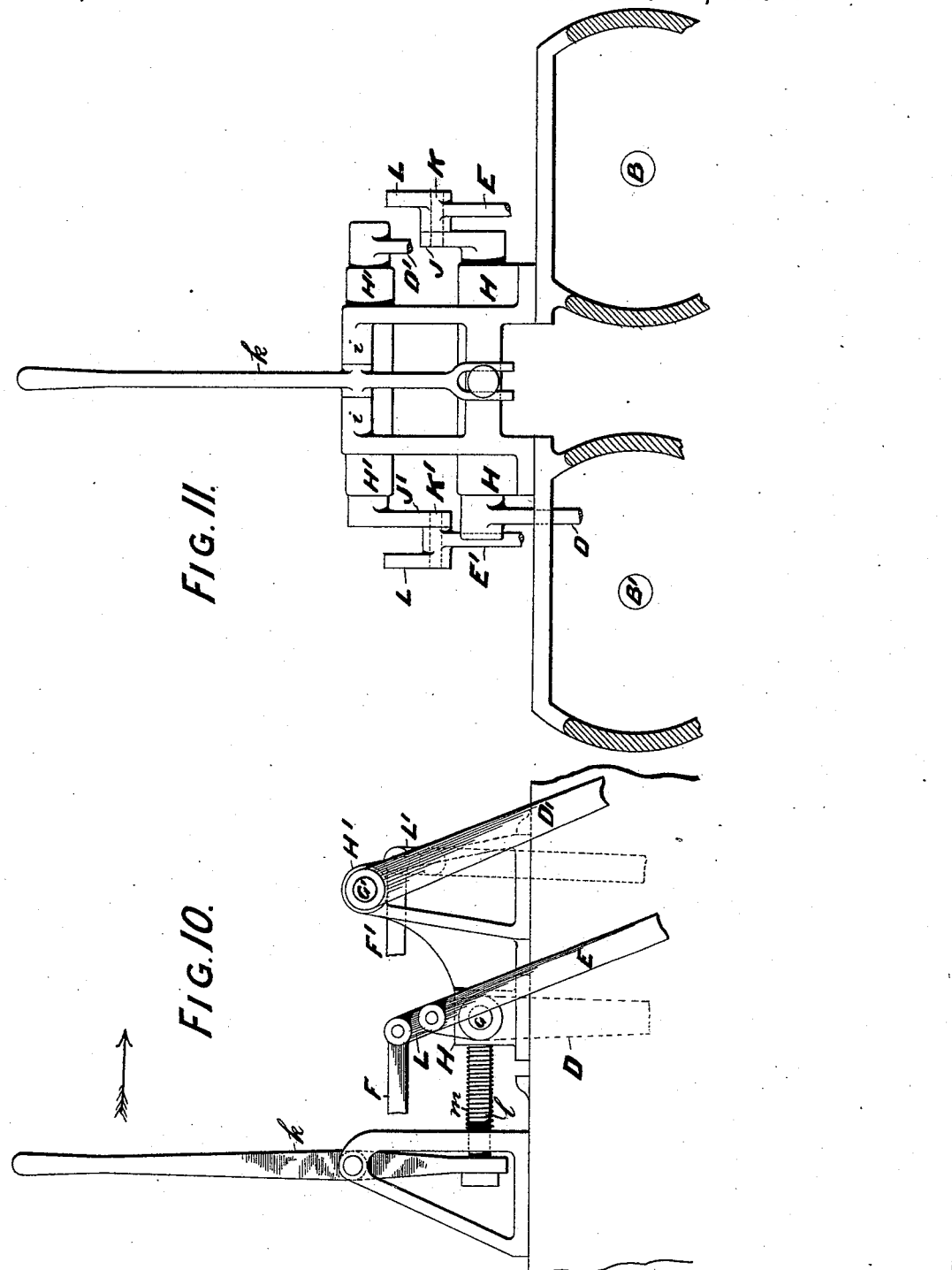

UNITED STATES PATENT OFFICE.

HERBERT WILLIAM MORLEY, OF BRADFORD, AND THOMAS HOLEHOUSE, OF CHORLTON-CUM-HARDY, ENGLAND.

VALVE-GEAR FOR DUPLEX DIRECT-ACTING ENGINES.

SPECIFICATION forming part of Letters Patent No. 516,896, dated March 20, 1894.

Application filed June 22, 1893. Serial No. 478,472. (No model.) Patented in England July 12, 1888, No. 10,164.

*To all whom it may concern:*

Be it known that we, HERBERT WILLIAM MORLEY, residing at 54 Ash Grove, Bradford, in the county of York, and THOMAS HOLE-HOUSE, residing at 70 Sunnyside, Chorlton-cum-Hardy, in the county of Lancaster, England, subjects of the Queen of Great Britain and Ireland, have invented certain new and useful Improvements in and Appertaining to the Valve-Gear of Duplex Direct-Acting Engines, (for a part of which the said Thomas Holehouse obtained a patent in Great Britain, No. 10,164, bearing date July 12, 1888,) of which the following is a specification.
The invention consists in the devices and combinations of devices hereinafter particularly described and pointed out in the claims.

Figure 2:
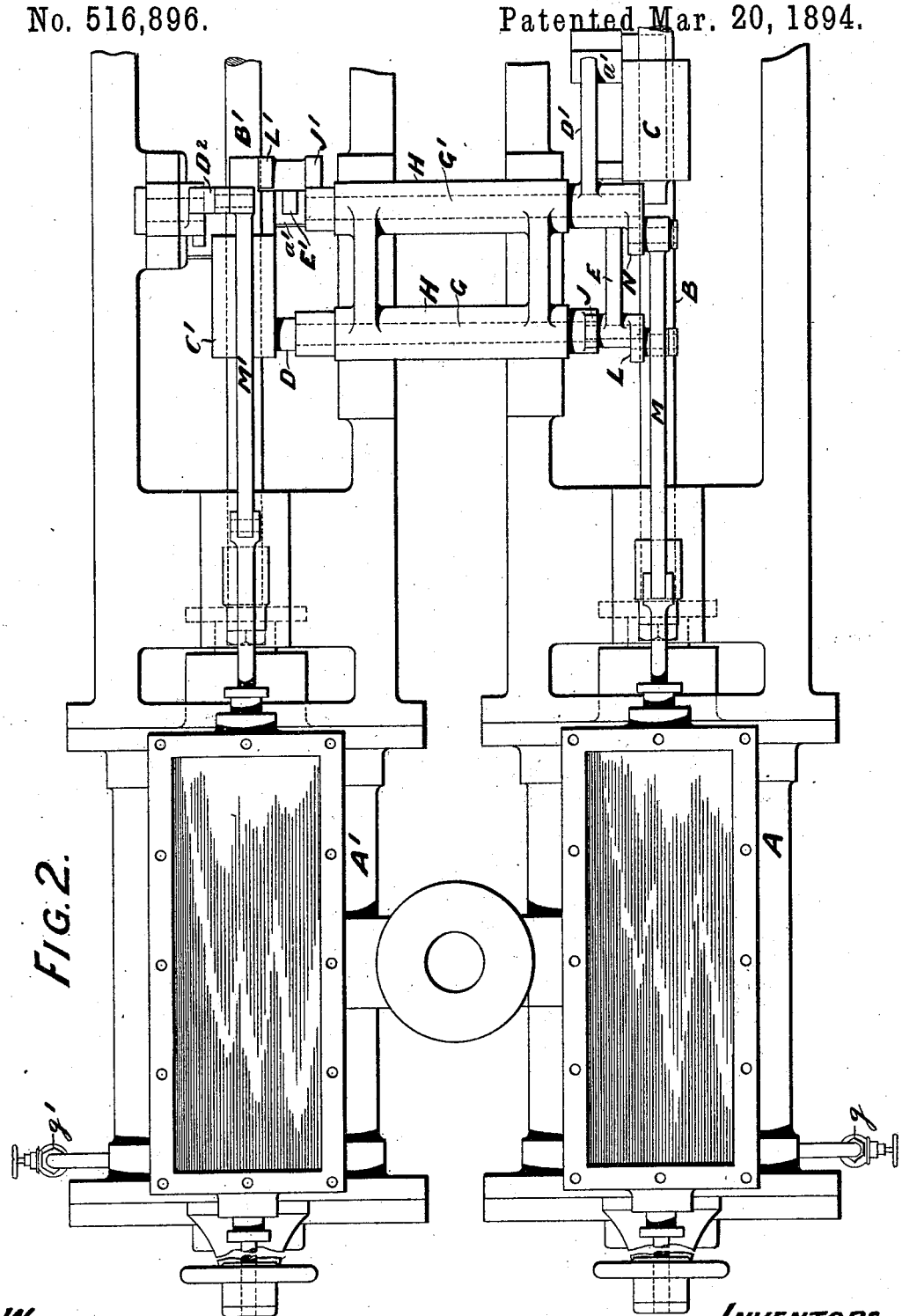
Figure 3:
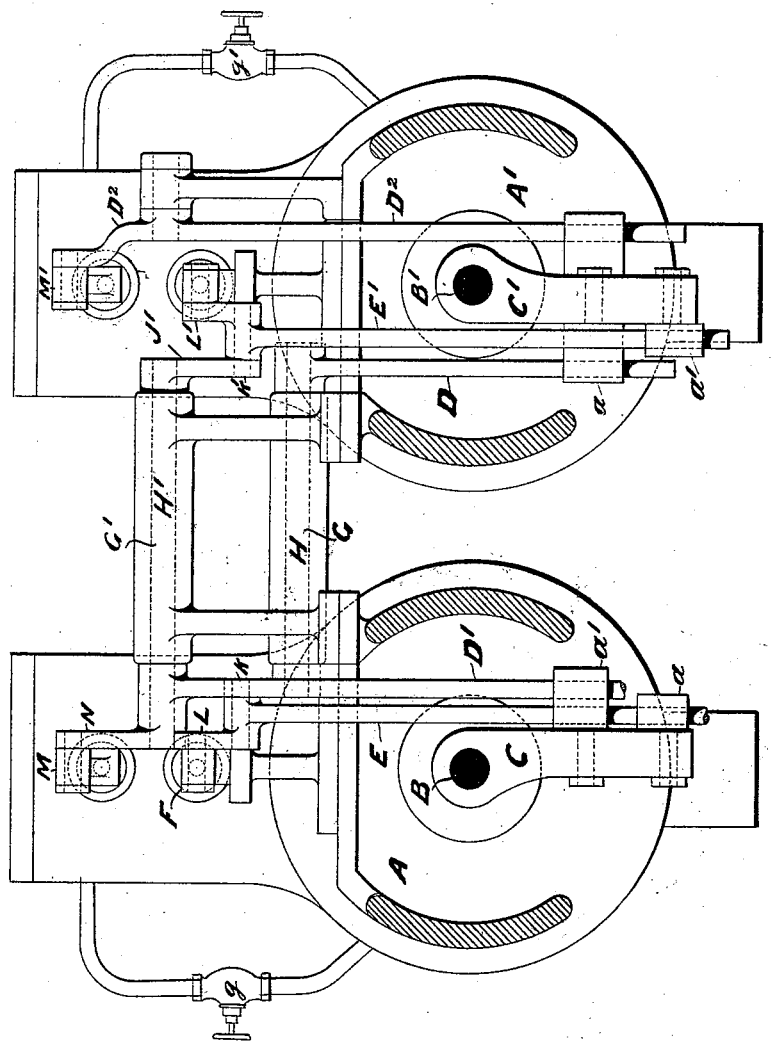

Referring to the drawings which form part of this specification,—Figure 1, represents the valve arrangements of a duplex direct acting engine according to our invention, the valve levers being shown in side elevation, and the cylinder and valves of the near cylinder in longitudinal section, Fig. 2 being a plan, and Fig. 3 an end view of same, or a section through the piston rods between the engine and pump. Figs. 4, 5, and 6, illustrate the means for regulating the expansion of the steam in cylinders by varying the length and ratio of the actuating levers, Fig. 4, being a side view, Fig. 5 a plan, and Fig. 6 an end view of same, the crossheads in Fig. 6 being taken in section on lines *a—b* and *c—d* in Fig. 4 respectively. Fig. 7, illustrates in side elevation means for regulating the stroke of the cut off valve. Fig. 8, illustrates in side elevation the arrangement of parts, whereby a duplex direct acting engine with the herein described arrangement of valve gear, may carry steam to the full length of stroke if desired. Figs. 9, 10, and 11, illustrate the arrangement of parts to facilitate starting when the engine is worked expansively, Fig. 9, being a side elevation of one such arrangement, and Figs. 10 and 11 being side elevation, and end view respectively, of another arrangement for the same purpose.

In all the figures like letters denote like parts.

The letter A designates the near cylinder, and the letter A' the far cylinder of a duplex direct acting engine for working a duplex pump, the pistons of which move approximately in relation to each other as if connected to cranks at right angles, and so connected, as to act reciprocally upon the admission valves of each other.

B and B' are the piston rods, to which are attached crossheads C and C'. These crossheads are fitted with oscillating sleeve like blocks *a* and *a'*, to receive the ends of levers D and D', and E and E', for actuating the valve rods F and F', within which blocks as the crossheads travel to and fro, the levers have a sliding motion as they oscillate on centers or fulcrums as hereinafter described. These levers impart to the ordinary slide valves V, and V', a compound positive motion, which is effected as follows. Taking the motion of the levers connected with the valve of the near cylinder A, the lever D actuated by the crosshead of the far cylinder A', oscillates on a pin or shaft G, to which it is attached, the pin G being carried by a fixing or bracket H, and to which pin is attached a short lever or link J. The lever E actuated by the crosshead C, oscillates on a pin or stud K attached to the short lever or link J, and thus to the upper portion of the lever E designated by the letter L a compound motion is given or communicated to the valve rod F, by any suitable coupling arrangement. In connection with the far cylinder A' identically the same arrangement is adopted for actuating the valve rod F'. The lever D', actuated by the crossheads C, oscillates on the center of the pin G' carried by a bracket H', and lever E', actuated by crosshead C', and oscillating on pin K', is coupled to lever D' by the short lever or link J', motion being given to the valve rod F' by coupling up to the portion of the lever E' marked L'. This arrangement of levers so allows the gear of one cylinder to control the valve of the other, that in the event of the inaction or breakage of the pump, the proper amount of steam or other fluid is admitted to cushion the momentum of the piston, and prevent overrunning or the knocking of the cylinder ends, and compels the pistons to keep their proper juxtapositions, and further owing to the compound motion, the slide valve remains nearly stationary during a great part of the stroke of the piston, thus giving a good port opening for the admission of the steam, and as the piston approaches the end of its stroke, the valve has a quicker motion giving a clean cut off, and bringing it into position for the return stroke.

It will be seen that the position of the pin or stud K, which is carried by the short lever J keyed on the end of the shaft G, is regulated and controlled by the movement of the piston rod B' through the crosshead C', block a, and lever D, keyed to the opposite end of the shaft G, and as the stud K is the movable or variable fulcrum of the lever E, which operates the admission valve of cylinder A through valve rod F, it follows that any variation in the movement of the piston B', will be communicated to the stud K, and the lever E will be caused to cut off earlier or later, whereby the change in the movement of the piston B' of the cylinder A' will be balanced and compensated for by a corresponding change in the movement of the admission valve of the cylinder A. Similarly, as the position of the stud K', which is the movable and variable fulcrum of the lever E', is regulated and controlled by the movement of the piston rod B, of the cylinder A, and as the lever E' operates the admission valve of the cylinder A' through valve rod F', it follows that any change in the movement of the piston B, of the cylinder A, is communicated to and balanced by a corresponding change in the movement of the admission valve of the cylinder A'.

Having described means whereby we impart motion to the main valves, we will now proceed to set forth means for working cut off valves V and V', which may work in connection therewith, which said cut off valves may be cut off plates as shown in Fig. 1, a single cut off plate, or a cut off valve of the Corliss or other type.

The valve rods of the cut off plate are marked M and M' respectively, and in the case of the near cylinder A, we can work the valve rod M from its own crosshead C by a continuation of the lever D' beyond its fulcrum, such portion being marked N, and which imparts to the valve rod a motion contrary to the crosshead, and is coupled to the valve spindle by any well known means. In the case of the cut off valve of the far cylinder A', we attach to the crosshead C' an additional lever D² oscillating on a pin carried by a suitable fixing or bracket, the center on which this lever oscillates, or fulcrum of the lever, being about the same distance from the center line of the engine, as in the case of the lever D', on the opposite side, so that the ratio of the levers for actuating the valve rods of the cut off valve is in both cases identical or thereabout. In some cases the expansion valve may be worked from a continuation of the levers or links J and J, or the valves may be actuated by rocking levers, to which motion is imparted by any of the levers named for working the main slide valves, the exact means of coupling to, or actuating the valve rods M and M' by their respective crossheads, being regulated by the special conditions under which the engines may have to work. In order to vary the expansion of the steam or other fluid in the cylinders, within any range, the cut off valve may be of the variable expansion type regulated by hand, the cut off valve shown in Fig. 1, being of the well known Meyer type. In case of the cut off valves being of the Corliss type, the expansion may be varied by lengthening or shortening the valve coupling rods. Another method of varying the expansion by lengthening or shortening the stroke of the valve rod by increasing or decreasing the distance between the center of the pin to which the valve rod is attached, and the center of the fulcrum upon which the actuating lever oscillates. Such an arrangement is shown in side elevation in Fig. 7. The lever N is slotted for the reception of a sliding block O, to which block the valve rod M is attached. The block O forms a nut for a screw O', and by the rotation of the latter by means of a hand-wheel, the sliding block is raised or lowered, and the length of the travel imparted to the valve rod M thereby varied as may be desired.

In Figs. 4, 5, and 6 the same mechanism of levers is adopted for actuating the valve rods F and F', as previously described, but means are applied whereby the ratio of the length of the actuating levers may be varied independently of one another, and for this purpose the crossheads C and C', are provided with slots for the reception of movable or sliding oscillating blocks a and a', which may be raised or lowered by screws b and b', fitted with hand wheels, the blocks a and a' forming sleeves for the reception of the extremities of the actuating levers D and D', so that as the blocks are raised or lowered on the levers, the point of application of motion supplied by the reciprocating crossheads, is brought nearer to or farther from the fulcrum, and the resultant distance of motion beyond the fulcrum thereby diminished or increased. The levers E and E' are similarly attached to their respective crossheads C and C', for which slots c and c', are provided, and fitted with sliding blocks d and d', which may be secured in any desired position in their respective slots by nuts, or other suitable means.

Fig. 8, illustrates in side elevation, our arrangement for enabling steam to be carried on to the full length of the stroke, if desired, and which said arrangement converts a duplex direct acting engine with valve gear having a compound positive motion, as previously described, working expansively, into a non expansive engine. This arrangement consists, in the provision of a certain amount of slack or lost action between the coupling from the actuating levers and the valves, and in a proportionate amount of lap taken off the valve, and may be effected as follows: To the valve spindle crosshead $e$, we fit a block $f$, which has a certain amount of longitudinal play therein as shown by the space $e'$. To the block $f$, the valve spindle $q$, is attached, also the valve rod F coupled at its other end to the actuating lever L. In operation it will be obvious that before the valve is moved in either direction, the block $f$ will have always been moved a distance equal to the amount of longitudinal play provided in the crosshead $e$. It is obvious that this slack action could be otherwise arranged between the actuating levers and the valves, for instance the valve spindles might be made with a certain amount of play in their attachments to the valves, or the valve rods might be prepared with slots to receive the coupling pins. In order to facilitate the starting, so that the engines may be started with the valves in any position, we provide valves $g$ and $g'$ to admit steam directly into the steam cylinders, either from the steam chest or steam pipes. These valves have no connection with, and are entirely distinct from the steam distribution valves, and are only required in the case of a duplex direct acting engine working expansively. Another arrangement shown in Fig. 9, which is a side elevation of same, consists of the arrangement of parts for providing a certain amount of slack action between the actuating levers, and the main valves as previously described, but with the addition of means whereby this slack action is arrested immediately the engine has got away. The block $f$ in the crosshead $e$, is prepared with a hole or depression into which fits a spring actuated catch $s$, holding the block $f$ in a fixed position in the crosshead. At such times as it may be desired to start the engine, the catch $s$ is withdrawn from the block $f$, by means of a manual lever $h$, which enables the engine to get away, after which the slack action is immediately arrested by the spring causing the catch to secure the block in its proper position again. A third arrangement for this purpose, consisting of means whereby the centers or fulcrums on which the levers D and D' oscillate, are manually moved horizontally, and the valves thereby opened are shown in Figs. 10 and 11, Fig. 10 being a side view, and Fig. 11 an end view of such an arrangement, which we carry out as follows: On the frame of the engine, we fix two brackets or supports $i$, carrying a lever $k$, forked, or otherwise prepared at its lower end to engage with a pin $l$, so that by manually drawing the same in the direction of the arrow, the brackets H and H', carrying the pins G and G' which are the centers or fulcrums on which the levers D and D' oscillate, are moved horizontally and the position of the valves thereby altered, whereby the steam or other fluid is admitted to the cylinders, and the starting of the engine thereby effected. For this purpose the brackets H and H' are prepared to slide in the frame, and further are brought back to their normal position upon the manual lever $k$ being released by means of the coiled spring $m$.

Having now described our invention, what we claim as new, and desire to secure by Letters Patent, is—

1. In a duplex direct acting engine, the combination of oscillating levers D and E, actuated by the cross heads C and C' respectively, the lever E oscillating on a movable stud K controlled by the lever D, for the purpose of regulating and controlling the admission valve V of the cylinder A, all arranged substantially in the manner as shown and described.

2. In a duplex direct acting engine, wherein the valve gear for regulating and controlling the valves V and V', consists of operating levers E and E', actuated by piston rods B and B' respectively, and fulcrumed on movable studs K and K', the position of which said studs is controlled by levers D and D', respectively actuated from the contrary piston rods B' and B, the combination therewith, of variable cut off valves actuated from their respective piston rods substantially as described.

3. In a duplex direct acting engine, the oscillating levers D and E actuated by cross heads C and C' respectively, the lever E oscillating on a movable stud K controlled by the lever D for controlling the admission valve V of the cylinder A, valves V V', actuating levers therefor and means for varying the movement of said valves, substantially as described.

4. In a duplex direct acting engine, wherein the valve gear for regulating and controlling the valves V and V', consists of operating levers E and E' actuated by piston rods B and B' respectively, and fulcrumed on movable studs K and K', the position of which said studs is controlled by levers D and D', respectively actuated from the contrary piston rods B' and B, the combination therewith of slotted cross heads C and C', fitted with movable blocks for the purpose of varying the ratio of the levers D and D', and E and E', all arranged substantially in the manner as shown and described.

5. In a duplex direct acting engine, the oscillating levers D and E actuated by the cross heads C and C' respectively, the lever E oscillating on a movable stud K controlled by the lever D the valve V and controlling lever F and a connection between the valve V and operating levers providing for a slack action, substantially as described.

6. In combination with the oscillating levers D and E actuated by the cross heads C and C' respectively the valve rod F and valve V and means for moving the fulcrum of lever D horizontally against spring pressure, substantially as described.

In witness whereof we have hereunto set our hands in presence of two witnesses.

HERBERT WILLIAM MORLEY.
 THOMAS HOLEHOUSE.

Witnesses:
 JAMES SIDNEY CRITCHLEY,
 LOUIS B. SMITH,
  *Both of Bradford.*